United States Patent
Chang et al.

(10) Patent No.: US 8,481,213 B2
(45) Date of Patent: *Jul. 9, 2013

(54) CATHODE ACTIVE MATERIAL FOR LITHIUM SECONDARY BATTERY

(75) Inventors: Sung Kyun Chang, Daejeon (KR); Hong-Kyu Park, Daejeon (KR); Ho Suk Shin, Seoul (KR); Seung Tae Hong, Daejeon (KR); Youngsun Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/303,001

(22) Filed: Nov. 22, 2011

(65) Prior Publication Data

US 2012/0064395 A1 Mar. 15, 2012

Related U.S. Application Data

(63) Continuation of application No. 13/053,579, filed on Mar. 22, 2011, now abandoned, which is a continuation of application No. 12/565,033, filed on Sep. 23, 2009, now Pat. No. 7,935,444, which is a continuation of application No. PCT/KR2009/005149, filed on Sep. 10, 2009.

(30) Foreign Application Priority Data

Sep. 10, 2008 (KR) .................. 10-2008-0089335

(51) Int. Cl.
| | |
|---|---|
| *C01D 1/02* | (2006.01) |
| *C01G 53/04* | (2006.01) |
| *C01G 51/04* | (2006.01) |
| *C01G 45/02* | (2006.01) |
| *H01M 4/50* | (2010.01) |
| *H01M 4/505* | (2010.01) |
| *H01M 4/52* | (2010.01) |
| *H01M 4/525* | (2010.01) |

(52) U.S. Cl.
USPC .......... 429/231.95; 423/593.1; 423/594.4; 423/594.6; 423/599; 429/231.1; 429/223; 429/224

(58) Field of Classification Search
USPC .......... 429/231.1, 231.95, 223, 224, 593.1, 429/594.4, 594.6, 599; 423/593.1, 594.4, 423/594.6, 599, 231.1, 231.95, 223, 224
See application file for complete search history.

(56) References Cited

U.S. PATENT DOCUMENTS

| | | | |
|---|---|---|---|
| 6,660,432 | B2 | 12/2003 | Paulsen et al. |
| 6,964,828 | B2 | 11/2005 | Lu et al. |
| 7,078,128 | B2 | 7/2006 | Lu et al. |
| 7,135,252 | B2 | 11/2006 | Thackeray et al. |
| 7,393,476 | B2 | 7/2008 | Shiozaki et al. |
| 2008/0160410 | A1 | 7/2008 | Sun et al. |
| 2008/0187825 | A1 | 8/2008 | Kawabata et al. |

FOREIGN PATENT DOCUMENTS

| | | |
|---|---|---|
| JP | 2001-083610 A | 3/2001 |
| KR | 10-2003-0034018 A | 5/2003 |
| KR | 10-2005-0047291 A | 5/2005 |

OTHER PUBLICATIONS

Hironori Kobayashi, Hikari Sakaebe, Hiroyuki Kageyama, Kuniaki Tatsumi, Yoshinori Arachi and Takashi Kamiyama, "Changes in the structure and physical properties of the solid solution LiNi12xMnxO2 with variation in its composition," J. Mater. Chem. (2003) 13, pp. 590-595.*

Masaki Yoshio, Hideyuki Noguchi, Jun-ichi Itoh, Masaki Okada, Takashi Mouri, "Preparation and properties of LiCoyMnxNi1-x-yO2 as a cathode for lithium ion batteries," Journal of Power Sources 90 (2000), pp. 176-181.*

BJ Hwang, YW Tsai, CH Chen and R Santhanam, "Influence of Mn content on the morphology and electrochemical performance of LiNi1-x-yCoxMnyO2 cathode materials," J Master. Chem. 13 (2003), pp. 1962-1968.

* cited by examiner

*Primary Examiner* — Steven Bos
*Assistant Examiner* — Diana J Liao
(74) *Attorney, Agent, or Firm* — Birch, Stewart, Kolasch & Birch, LLP

(57) ABSTRACT

Disclosed herein is a cathode active material for a lithium secondary battery, in particular, including a lithium transition metal oxide with a layered crystalline structure in which the transition metal includes a transition metal mixture of Ni, Mn and Co, and an average oxidation number of all transition metals other than lithium is more than +3, and specific conditions represented by the following formulae (1) and (2), $1.1 < m(Ni)/m(Mn) < 1.5$ and $0.4 < m(Ni^{2+})/m(Mn^{4+}) < 1$, are satisfied. The inventive cathode active material has a more uniform and stable layered structure by controlling the oxidation number of transition metals contained in a transition metal oxide layer to form the layered structure, compared to conventional substances. Accordingly, the active material exhibits improved overall electrochemical characteristics including battery capacity and, in particular, excellent high rate charge-discharge features.

22 Claims, No Drawings

CATHODE ACTIVE MATERIAL FOR LITHIUM SECONDARY BATTERY

This application is a Continuation of application Ser. No. 13/053,579 filed on Mar. 22, 2011 now abandoned, which is a Continuation of application Ser. No. 12/565,033, filed Sep. 23, 2009, now U.S. Pat. No. 7,935,444 B2. Application Ser. No. 12/565,033 is a Continuation of PCT International Application No. PCT/KR2009/005149 filed on Sep. 10, 2009, which claims priority to Korean Application No. 10-2008-0089335 filed in the Republic of Korea on Sep. 10, 2008. The entire contents of all of the above are hereby incorporated by reference.

TECHNICAL FIELD

The present invention relates to cathode active materials for lithium secondary batteries and, more particularly, to a cathode active material comprising a lithium based transition metal oxide with a layered crystalline structure, wherein the transition metal includes a transition metal mixture of Ni, Mn and Co, an average oxidation number of all transition metals other than lithium is more than +3, and a molar ratio of nickel to manganese, $m(Ni)/m(Mn)$ as well as a molar ratio of $Ni^{2+}$ to $Mn^{4+}$ ($m(Ni^{2+})/m(Mn^{4+})$) satisfy a specific condition. Such cathode material may control the oxidation number of the transition metal, leading to a uniform and stable layered crystalline structure, thereby enhancing overall electrochemical characteristics and exhibiting excellent rate features under high charge-discharge condition.

BACKGROUND ARTS

With technological advancement and demand for mobile instruments, demand for secondary batteries as an energy source is rapidly increasing. Among such secondary batteries, a lithium secondary battery having high energy density and working potentials, a long life cycle, and reduced self-discharge is widely available in the related art.

In addition, as environmental problems are increasingly of concern, a great deal of studies and investigation into an electric car and/or a hybrid car capable of replacing typical vehicles using fossil fuels such as gasoline, diesel, etc. are currently conducted. Such an electric and/or hybrid vehicle mostly uses a nickel metal hydride based secondary battery as a power source. However, a lithium secondary battery having high energy density and discharge voltage has also been actively studied in recent years and has partially entered commercialization.

A major cathode active material for the lithium secondary battery comprises lithium-containing cobalt oxide $LiCoO_2$. Other substances including, for example, lithium-containing manganese oxide such as $LiMnO_2$ with a layered crystalline structure or $LiMn_2O_4$ with a spinel crystalline structure, lithium-containing nickel oxide $LiNiO_2$, and the like may also be considered.

Especially, although $LiCoO_2$ with excellent lifespan and charge-discharge efficiency is widely used, the above material has some disadvantages such as low structural stability, high price due to cobalt as a limited mineral resource and, in turn, restriction in price competitiveness.

Lithium-manganese oxides such as $LiMnO_2$, $LiMn_2O_4$, etc. have excellent thermal stability and economic merits, however, they entail some problems such as low capacity, poor high temperature characteristics, and so forth.

In addition, $LiNiO_2$ active material is relatively cheap and has favorable battery characteristics with high discharge capacity. However, the foregoing active material shows a rapid phase transformation in crystalline structure caused by variation in volume during charge-discharge cycle and encounters a problem of drastically reduced stability when exposed to air and moisture.

In order to solve the above problems, the present invention is directed to provision of an economical cathode active material with high performance, including a lithium transition metal composite oxide in which each of constitutional elements has desired composition and oxidation number, as described below.

In this regard, U.S. Pat. No. 6,964,828 discloses a lithium transition metal oxide represented by $Li(M1_{(1-x)}-Mn_x)O_2$ wherein M1 is a metal other than Cr and, if M1 is Ni or Co, all Ni in the oxide has an oxidation number of +2, all Co in the oxide has an oxidation number +3, and all Mn in the oxide has an oxidation number of +4.

Korean Laid-Open Application No. 2005-047291 discloses a lithium transition metal oxide containing Ni and Mn in equal proportions, wherein the oxidation numbers of Ni and Mn are +2 and +4, respectively.

Korean Patent No. 0543720 proposes a lithium transition metal oxide containing Ni and Mn in equal proportions, wherein the oxidation numbers are defined by Ni=2.0 to 2.5 and Mn=3.5 to 4.0, according to a typical method of measuring oxidation number. This means that Ni and Mn substantially have the oxidation numbers of +2 and +4, respectively. According to examples and comparative examples of the foregoing patent, it was described that the performance of the oxide may be deteriorated if the oxidation numbers of Ni and Mn are not +2 and +4, respectively.

Japanese Laid-Open Application No. 2001-00083610 suggests a lithium transition oxide represented by $Li((Li(Ni_{1/2}Mn_{1/2})_{(1-x)})O_2$ or $Li((Li_x(Ni_yMn_yCo_p)_{(1-x)})O_2$, which contains Ni and Mn in equal proportions. Here, when Ni and Mn are substantially present in equal proportions, the oxide may include $Ni^{2+}$ and $Mn^{4+}$ and, in turn, structural stability, thereby obtaining a layered structure.

According to the above listed technologies, an average transition metal oxidation number may be +3. As an alternative example, U.S. Pat. No. 7,314,682 claims a compound represented by $Li_{(2+2x)/(2+x)}M'_{2x(2+x)/(2+2x)}M_{(2-2x)/(2+x)}O_{2-\delta}$ wherein M' is an element with an average oxidation number of +3 except for Li, while M is a transition metal element with an average oxidation number of +3.

As disclosed in the above documents, provided that (i) a stable laminate structure is obtained when a lithium transition oxide includes transition metals with an average oxidation number of +3, the lithium transition oxide may exhibit superior electrochemical characteristics only when Ni and Mn are present in equal proportions and Ni has the average oxidation number of +2 while Mn has the average oxidation number of at least +4.

However, the present inventors found that, although a lithium transition metal oxide contains Mn and Ni in $Mn^{4+}$ and $Ni^{2+}$ states, respectively, so as to reach the oxidation number of +3, deterioration in electrochemical performance of the oxide caused by reversible migration of $Ni^{2+}$ to a Li site cannot be overcome.

In addition, U.S. Pat. No. 6,660,432 proposes that a Co content of more than 10% and, preferably, 16% relative to a total amount of transition metals enables production of a well-grown crystalline structure and contents of Ni and Mn are substantially equal. However, if the Co content is too high, production costs are increased and $Co^{4+}$ contained in transition metals during a charge state may be considerably unstable, thus reducing stability of the oxide.

U.S. Pat. Nos. 7,078,128 and 7,135,252 disclose substances containing more Mn than Ni. However, the present inventors found from experimental results that the oxidation number of Mn is unable to be varied during Li charging if Mn content is high, thereby reducing the capacity of a lithium transition metal oxide.

DISCLOSURE

Technical Problem

Therefore, the present invention is directed to solving conventional problems described above and to overcoming technical restrictions in related arts, and an object of the present invention is to provide a cathode active material with excellent electrochemical characteristics.

As a result of extensive studies and experiments executed by the present inventors, it was found that a cathode active material with a layered crystalline structure based on a lithium transition metal oxide exhibits improved structure and high rate charge-discharge characteristics of the active material are remarkably enhanced when an average oxidation number of each transition metal is more than +3, Ni content is higher than Mn content while $Ni^{2+}$ content is less than $Mn^{4+}$ content and, therefore, the present invention has been successfully completed.

Technical Solution

In order to accomplish the above object of the present invention, there is provided a cathode active material for a lithium secondary battery, comprising a lithium transition metal oxide with a layered crystalline structure, in which the transition metal includes a transition metal mixture of Ni, Mn and Co, an average oxidation number of all transition metals other than Li is more than +3 and satisfies both conditions represented by the following formulae (1) and (2):

$$1.1 < m(Ni)/m(Mn) < 1.5 \quad (1)$$

$$0.4 < m(Ni^{2+})/m(Mn^{4+}) < 1 \quad (2)$$

wherein m(Ni)/m(Mn) is a molar ratio of nickel to manganese and $m(Ni^{2+})/m(Mn^{4+})$ is a molar ratio of $Ni^{2+}$ to $Mn^{4+}$.

An example of the layered crystalline structure may be an $\alpha$-$NaFeO_2$ laminate structure.

As described above, it is conventionally known that a layered structure is preferably formed by adding $Ni^{2+}$ and $Mn^{4+}$ in equal amounts in order to obtain transition metal ions with an average oxidation number of +3. However, $Ni^{2+}$ has substantially the same size as $Li^+$, migrates to a Li layer and, in turn, is likely to form a rock salt structure. Accordingly, the above active material entails a problem of deteriorated electrochemical performance.

The present inventors have undertaken advanced research and studies to prepare a cathode active material having excellent rate features, high capacity, as well as a stably layered crystalline structure, and surprisingly found that the stable layered crystalline structure depends on a difference in size between lithium ions and transition metal ions rather than $Ni^{2+}$ and $Mn^{4+}$.

More particularly, a lithium transition metal composite oxide with a layered crystalline structure may separately comprise a Li-oxide layer ("lithium layer") containing lithium and a transition metal-oxide layer ("MO layer") containing transition metals. Here, when a difference in size between ions contained in both the foregoing layers, that is, lithium ions to transition metal ions is enlarged, both the layers are suitably separated and grown, respectively.

In this regard, use of a metal element having a smaller ion radius in an MO layer may be considered to enlarge the size difference of ions. However, the number of metal ions for migrating electrons is decreased, leading to relatively reduced capacity of the active material, although the layered structure is successfully obtained.

As a result of efforts by the present inventors to attain a superior layered crystalline structure without reduced capacity, it was determined that the size difference of ions may be expressed as a bond distance or bond strength of the foregoing ions to oxygen ions and, in addition, a metal with cationic properties has reduced ion radius with increased oxidation number so that the MO layer may be more obviously distinguishable from the Li layer by increasing the oxidation number of the transition metal. From numerous experiments, the foregoing finding was practically identified.

As such, a concept for a layered crystalline structure well-grown by increasing an average oxidation number of transition metal to more than +3, leading to a difference in size between lithium ions and transition metal ions, may substantially overturn conventional wisdom in related arts, that is, such that the oxidation number of transition metals must be adjusted to +3 so as to enable stabilization of a layered crystalline structure.

Meanwhile, when Ni content is substantially equal to Mn content, $Mn^{4+}$ ions induce formation of $Ni^{2+}$ ions so that a large amount of $Ni^{2+}$ ions is present in the Li layer of a Mn-enriched compound, thus being undesirable.

The present inventors expect that a process for increasing the overall oxidation number of transition metals, more particularly, an average oxidation number of transition metals to more than +3 by reducing an amount of $Ni^{2+}$ easily introduced into a Li layer, may be considerably effective. In addition, it is considered that size difference of ions may be enlarged by increasing an amount of $Ni^{3+}$ ions having a smaller size than $Ni^{2+}$.

Accordingly, a cathode active material of the present invention has a relatively large amount of nickel rather than manganese (see Formula (1)) and a relatively small amount of $Ni^{2+}$, compared to $Mn^{4+}$ (see Formula (2)).

BEST MODE

The above and other objects, features and other advantages of the present invention will be more clearly understood from the following detailed description.

A cathode active material according to the present invention comprises a lithium nickel-manganese-cobalt oxide, wherein (i) an average oxidation number of all transition metals other than lithium is more than +3, (ii) nickel content is relatively higher than manganese content, and (iii) $Ni^{2+}$ content is relatively lower than $Mn^{4+}$ content.

For the inventive lithium nickel-manganese-cobalt oxide, the average oxidation number of transition metals is maintained to a level more than +3 which in turn noticeably reduces an amount of transition metals present in a lithium layer based on a stable crystalline structure of the cathode active material, thereby improving mobility and rate features of lithium ions and enhancing a capacity of the active material.

With regard to the first characteristic (i) of the inventive cathode active material, since the average oxidation number of all transition metals other than lithium is more than +3, the overall size of transition metal ions is decreased, compared to other transition metals with an average oxidation number of +3. Therefore, a difference in size between the transition metal ions and lithium ions is remarkably enlarged to enable interlayer separation thereof, thus forming a stable layered crystalline structure.

However, if the average oxidation number of transition metals is too high, an amount of charge to migrate lithium ions is decreased, reducing the capacity of the active material. Therefore, the average oxidation number of transition metals is preferably more than 3.0 to not more than 3.5, more preferably 3.01 to 3.3 and, particularly preferably, 3.1 to 3.3.

In this case, the overall average oxidation number of manganese and nickel with a content corresponding to that of manganese may be more than 3.0 to not more than 3.5 and, preferably, 3.1 to 3.3.

"The average oxidation number of transition metals other than lithium" means, for example, that an average oxidation number of lithium ions may be negligible even when a part of lithium ions is present in a transition metal site.

Such an average oxidation number of each transition metal may be adjusted by, for example, varying a ratio of a transition metal to a transition metal precursor and an amount of a lithium precursor reacted during production of lithium transition metal oxide.

With regard to the foregoing characteristic (ii), the cathode active material of the present invention exhibits a molar ratio of nickel to manganese ranging from more than 1.1 to less than 1.5, as shown in the following Formula (1):

$$1.1 < m(Ni)/m(Mn) < 1.5 \tag{1}$$

As such, if an amount of nickel is considerably more than that of manganese, at least an excess portion of nickel over a content of manganese is changed into $Ni^{3+}$ whereas the size of an ion is relatively decreased. Accordingly, a difference in average size between lithium ions and transition metal ions is enlarged and introduction of $Ni^{2+}$ into a lithium layer is considerably reduced, thereby enhancing stability of the layered crystalline structure.

However, if m(Ni)/m(Mn) is more than 1.5, structural stability is relatively deteriorated due to reduction of Mn content and production costs are increased, thus being undesirable. More preferably, m(Ni)/m(Mn) ranges from 1.2 to 1.4.

In contrast, when an average oxidation number of transition metals is more than +3 even if Mn content is higher than Ni content, it was found that an amount of ions with an atomic valence of +4 not contributing to charge-discharge is relatively increased, reducing the capacity of the active material, although a layered crystalline structure is formed.

As described above, the cathode active material of the present invention contains nickel in an amount considerably larger than manganese and the nickel portion comprises nickel (a) with an excess content relative to a content of manganese, as well as nickel (b) with a content corresponding to the content of manganese.

The foregoing nickel has an average oxidation number of more then +2.

The nickel (a) with the excess content relative to the content of manganese is preferably $Ni^{3+}$, while the nickel (b) with a content corresponding to the content of manganese preferably includes both $Ni^{+2}$ and $Ni^{+3}$.

$Ni^{3+}$ content may range from 11 to 60% relative to a total amount of the nickel (b) containing $Ni^{2+}$ and $Ni^{3+}$. When the $Ni^{3+}$ content is less than 11%, desired electrochemical characteristics are hardly achieved. On the other hand, if the $Ni^{3+}$ content is more than 60%, variation in oxidation number is too low which in turn may cause drastic reduction in capacity and increase in lithium dispersion. Therefore, both the foregoing cases are not desirable. Here, the average oxidation of manganese and nickel approximately ranges from 3.05 to 3.35.

With regard to the foregoing characteristic (iii), the cathode active material of the present invention exhibits a molar ratio of $Ni^{2+}$ to $Mn^{4+}$ ranging from more than 0.4 to less than 1, as shown in the following Formula (2). That is, $Mn^{4+}$ and $Ni^{2+}$ are not contained in equal amounts. Instead $Ni^{2+}$ content is relatively lower than $Mn^+$ content.

$$0.4 < m(Ni^{2+})/m(Mn^{4+}) < 1 \tag{2}$$

If $m(Ni^{2+})/m(Mn^{4+})$ is more than 1, the average oxidation number of transition metals is not increased, in turn, not leading to difference in size of ions. On the other hand, when $m(Ni^{2+})/m(Mn^{4+})$ is less than 0.4, the average oxidation number of transition metals is too high, in turn, decreases an amount of charge to be migrated, thus reducing the capacity of the active material. As a result, with $m(Ni^{2+})/m(Mn^{4+})$ in the range of more than 0.4 to not more than 0.9, excellent electrochemical characteristics may be accomplished.

Among transition metals in the cathode active material, Co content may be less than 10 mol % relative to a total amount of the transition metals. As the Co Content is increased, production costs are increased and $Co^{4+}$ in a charge state is unstable, reducing stability of the active material and thus being undesirable.

As described above, since the cathode active material of the present invention contains nickel in a considerably greater amount than manganese and the average oxidation number of transition metals is more than +3, a difference in size between lithium ions and transition metal ions is enlarged, accelerating interlayer separation, which in turn minimizes introduction of $Ni^{2+}$ into a lithium layer. Accordingly, Ni content may be less than 5 mol % in terms of a ratio of $Ni(Ni^{2+})$ site to a total Li site, i.e., a ratio that some of Li sites is occupied by $Ni(Ni^{2+})$.

For the lithium transition metal oxide of the present invention, Ni, Mn and Co among the transition metals may be partially substituted with other metal elements within a range at which the layered crystalline structure is continuously maintained. Preferably, the foregoing transition metals are substituted by a small amount of metal elements and/or cationic elements within 5%. So long as the foregoing description satisfies features of the present invention, this is obviously included within the scope of the present invention.

The present invention also provides a cathode type electrode including the cathode active material described above and a lithium secondary battery comprising the above cathode.

Hereinafter, the above cathode type electrode is abbreviated to "cathode."

The lithium secondary battery generally includes a cathode, an anode, a separator and a non-aqueous electrolyte containing lithium salt.

The cathode is fabricated by, for example, applying a mixture of the cathode active material, a conductive material and a binder to a cathode collector and drying the coated collector. Optionally, a filler may be added to the mixture.

The cathode collector generally has a thickness in the range of 3 to 500 μm. Such cathode collector is not particularly restricted so long as it has a high conductivity without causing chemical modification to a battery. For example, the cathode collector may be fabricated using stainless steel, aluminum, nickel, titanium, calcined carbon, or stainless steel or aluminum surface-treated with carbon, nickel, titanium or silver, and the like. The collector may have fine irregularities formed on the surface thereof in order to improve adhesiveness of the cathode active material of the cathode collector. The collector may be fabricated in different forms such as a film, sheet, foil, mesh, porous material, foam material, non-woven material, and so forth.

The conductive material is generally added in an amount of 1 to 40 wt. % relative to a total weight of the mixture containing the cathode active material. Such conductive material is not particularly restricted if it has conductive properties without causing chemical modification to a battery. Examples of the conductive material may include: graphite such as natural graphite or artificial graphite; carbon black such as carbon black, acetylene black, ketchen black, channel black, furnace black, lamp black, summer black, etc.; conductive fiber such as carbon fiber or metal fiber; metal powder such as carbon fluoride, aluminum, nickel powder, etc.; conductive whiskers such as zinc oxide, potassium titanate, etc.; conductive metal oxides such as titanium oxide; conductive substances such as polyphenylene derivatives, and the like.

The binder assists combination of the active material and/or conductive material and attachment to the collector, and is generally added with an amount of 1 to 40 wt. % relative to a total weight of the mixture containing the cathode active material. Examples of such binder may include polyvinylidene fluoride, polyvinyl alcohol, carboxymethyl cellulose (CMC), starch, hydroxypropyl cellulose, regenerated cellulose, polyvinylidone, tetrafluoroethylene, polyethylene, polypropylene, ethylene-propylene-diene terpolymer (EPDM), sulfonated EPDM, styrene butylene rubber, fluorinated rubber, various copolymers, etc.

The filler inhibits expansion of the cathode and is optional. The filler is not particularly restricted so long as it comprises fibrous materials without causing chemical modification to a battery. Examples of such filler may include olefin polymers such as polyethylene, polypropylene, etc., fibrous materials such as glass fiber or carbon fiber, and so forth.

The anode may be fabricated by applying an anode active material to the anode collector and drying the coated collector. Optionally, the anode may further include the foregoing ingredients.

The anode collector generally has a thickness in the range of 3 to 500 μm. Such anode collector is not particularly restricted so long as it has conductive properties without causing chemical modification to a battery. For example, the anode collector may be fabricated using copper, stainless steel, aluminum, nickel, titanium, calcined carbon, or copper or stainless steel surface-treated with carbon, nickel, titanium or silver, aluminum-cadmium alloy, and the like. Like the cathode collector, the anode collector may have fine unevenness on the surface thereof in order to improve adhesiveness of the anode active material of the anode collector. The collector may be fabricated in different forms such as a film, sheet, foil, mesh, porous material, foam material, non-woven material, and so forth.

Examples of the anode active material may include: carbon such as non-graphitizing carbon (or hard carbon), graphite carbon, etc.; combined metal oxides represented by $Li_yFe_2O_3$ ($0 \leq y \leq 1$) or $Li_yWO_z$ ($0 \leq y \leq 1$), $Sn_xMe_{1-x}M'_yO_z$ (wherein Me is Fe, Pb or Ge, Me' is Al, B, P, Si, or I, II or III group elements, halogen elements, and $0 < x \leq 1$, $1 \leq y \leq 3$, $1 \leq z \leq 8$); lithium metal; lithium alloys; silicon alloys; tin alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, etc.; conductive polymers such as acetylene; Li—Co—Ni materials, and the like.

The separator is interposed between the cathode and the anode and is composed of a thin insulation film having a high ion permeability and excellent mechanical strength. Each pore in the separator has a diameter of 0.01 to 10 μm and a thickness of the separator ranges from 5 to 300 μm. Examples of such separator may include a sheet or non-woven cloth consisting of: olefin polymer such as polypropylene with chemical-resistance and hydrophobicity; or glass fiber or polyethylene. When a solid electrolyte comprising polymer is used, this electrolyte may also serve as the separator.

A non-aqueous electrolyte containing lithium salt comprises lithium salt as well as an electrolyte and examples of the electrolyte may include an aprotic solvent, organic solid electrolyte, inorganic solid solvent, etc.

Such non-aqueous organic solvent may be an aprotic solvent including, for example: N-methyl-2-pyrrolidinone; propylene carbonate; ethylene carbonate; butylene carbonate; dimethyl carbonate; diethyl carbonate; γ-butyrolactone; 1,2-dimethoxyethane; tetrahydrofuran; 2-methyl tetrahydrofuran; dimethyl sulfoxide; 1,3-dioxolane; formamide; dimethyl formamide; dioxolane; acetonitrile; nitromethane; methyl formate; methyl acetate; phosphoric triester; trimethoxymethane; dioxolane derivatives; sulfolane; methyl sulfolane; 1,3-dimethyl-2-imidazolidinone; propylene carbonate derivative; tetrahydrofuran derivative; ether; methyl propionate; ethyl propionate, etc.

Such organic solid electrolyte is propylene derivative, olyethylene oxide derivative; polyproplene oxide derivative; phosphoric ester polymer; poly agitation lysine; polyester sulfide; polyvinyl alcohol; polyvinylidene fluoride; polymer having ionic dissociated group, etc.

Such inorganic solid electrolyte may include, for example, nitride, halide, sulfate of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—NiOH, $Li_3PO_4$—$Li_2S$—$SiS_2$.

The lithium salt is easily dissolved in the non-aqueous electrode and may include, for example, LiCl, LiBr, LiI, $LiClO_4$, $LiBF_4$, $LiB_{10}Cl_{10}$, $LiPF_6$, $LiCF_3SO_3$, $LiF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, low aliphatic carboxylic lithium, lithium 4-phenyl borate, imide, and the like.

The electrolyte may further include other compounds for improving charge-discharge features or flame retardant property, for example: pyridine, triethyl phosphite, triethanolamine, cyclic ether, ethylenediamine, n-glyme, hexaphosphoric triamide, nitrobenzene derivative, sulfur, quinone imine dye, N-substituted oxazolidinone, N,N-substituted imidazolidine, ethyleneglycol dialkylether, ammonium salt, pyrrol, 2-methoxy ethanol, aluminum trichloride, etc. Optionally, the electrolyte may include a halogen solvent such as carbon tetrachloride, ethylene trifluoride, etc. to provide non-flammability and/or carbon dioxide gas to improve high temperature shelf-life of the electrolyte.

The lithium secondary battery according to the present invention may be effectively used as a power source of a vehicle requiring high electric capacity such as an electric car, a hybrid electric car, a plug-in hybrid electric car, etc.

MODE OF INVENTION

Hereinafter, exemplary embodiments of the present invention will be described in greater detail with reference to the following examples. However, those skilled in the art will appreciate that these embodiments are proposed for illustrative purpose only but do not restrict the scope of the present invention.

Example 1

A transition metal mixture comprising a nickel salt and a manganese salt wherein a molar ratio of Ni/Mn is 1.24 and a cobalt salt is contained in an amount of 8 mol % relative to a total amount of mixture was prepared and dissolved in distilled water. Increasing basicity of the solution containing the foregoing transition metals, a transition metal composite was produced. The obtained composite was filtered through a vacuum filter to remove the solvent, followed by drying in an oven at 110° C. for 18 hours to completely eliminate excess solvent. After adding a Li salt to the resultant product to achieve a molar ratio of $Ni^{2+}/Mn^{4+}$ of 0.76, the mixture was placed in an electric furnace. After elevating the temperature of the furnace to 950° C. at 300° C. per hour, the mixture was subjected to calcination at the same temperature for 10 hours so as to produce a lithium transition metal composite oxide.

Example 2

A lithium transition metal composite oxide was prepared according to the same procedure as described in Example 1, except that the molar ratio of $Ni^{2+}/Mn^{4+}$ was 0.64.

Example 3

A lithium transition metal composite oxide was prepared according to the same procedure as described in Example 1, except that the molar ratio of $Ni^{2+}/Mn^{4+}$ was 0.52.

Example 4

A lithium transition metal composite oxide was prepared according to the same procedure as described in Example 1, except that the molar ratio of $Ni^{2+}/Mn^{4+}$ was 0.41.

Example 5

A lithium transition metal composite oxide was prepared according to the same procedure as described in Example 1, except that the molar ratio of $Ni^{2+}/Mn^{4+}$ was 0.88.

Comparative Example 1

A lithium transition metal composite oxide was prepared according to the same procedure as described in Example 1, except that the molar ratio of $Ni^{2+}/Mn^{4+}$ was 1.

Comparative Example 2

A lithium transition metal composite oxide was prepared according to the same procedure as described in Example 1, except that the molar ratio of $Ni^{2+}/Mn^{4+}$ was 0.29.

Example 6

A transition metal mixture comprising a nickel salt and a manganese salt wherein a molar ratio of Ni/Mn is 1.24 and a cobalt salt is contained with an amount of 8 mol % to a total amount of mixture was prepared and dissolved in distilled water. Increasing basicity of the solution containing the foregoing transition metals, a transition metal composite was produced. The obtained composite was filtered through a vacuum filter to remove the solvent, followed by drying in an oven at 110° C. for 18 hours to completely eliminate excess solvent. After adding a Li salt to the resultant product to achieve a molar ratio of $Ni^{2+}/Mn^{4+}$ of 0.76, the mixture was placed in an electric furnace. After elevating the temperature of the furnace to 950° C. at 300° C. per hour, the mixture was subjected to calcination at 960° C. for 10 hours so as to produce a lithium transition metal composite oxide.

Example 7

A lithium transition metal composite oxide was prepared according to the same procedure as described in Example 6, except that the molar ratio of $Ni^{2+}/Mn^{4+}$ was 0.64.

Example 8

A lithium transition metal composite oxide was prepared according to the same procedure as described in Example 6, except that the molar ratio of $Ni^{2+}/Mn^{4+}$ was 0.52.

Example 9

A lithium transition metal composite oxide was prepared according to the same procedure as described in Example 6, except that the molar ratio of $Ni^{2+}/Mn^{4+}$ was 0.41.

Example 10

A lithium transition metal composite oxide was prepared according to the same procedure as described in Example 6, except that the molar ratio of $Ni^{2+}/Mn^{4+}$ was 0.88.

Comparative Example 3

A lithium transition metal composite oxide was prepared according to the same procedure as described in Example 6, except that the molar ratio of $Ni^{2+}/Mn^{4+}$ was 1.

Comparative Example 4

A lithium transition metal composite oxide was prepared according to the same procedure as described in Example 6, except that the molar ratio of $Ni^{2+}/Mn^{4+}$ was 0.29.

Example 11

A transition metal mixture comprising a nickel salt and a manganese salt wherein a molar ratio of Ni/Mn is 1.24 and a cobalt salt is contained in an amount of 8 mol % relative to a total amount of the mixture was prepared and dissolved in distilled water. Increasing basicity of the solution containing the foregoing transition metals, a transition metal composite was produced. The obtained composite was filtered through a vacuum filter to remove the solvent, followed by drying in an oven at 110° C. for 18 hours to completely eliminate excess solvent. After adding a Li salt to the resultant product to achieve a molar ratio of $Ni^{2+}/Mn^{4+}$ of 0.76, the mixture was placed in an electric furnace. After elevating the temperature of the furnace to 950° C. at 300° C. per hour, the mixture was subjected to calcination at 970° C. for 10 hours so as to produce a lithium transition metal composite oxide.

Example 12

A lithium transition metal composite oxide was prepared according to the same procedure as described in Example 11, except that the molar ratio of $Ni^{2+}/Mn^{4+}$ was 0.64.

Example 13

A lithium transition metal composite oxide was prepared according to the same procedure as described in Example 11, except that the molar ratio of $Ni^{2+}/Mn^{4+}$ was 0.52.

Example 14

A lithium transition metal composite oxide was prepared according to the same procedure as described in Example 11, except that the molar ratio of $Ni^{2+}/Mn^{4+}$ was 0.41.

Example 15

A lithium transition metal composite oxide was prepared according to the same procedure as described in Example 11, except that the molar ratio of $Ni^{2+}/Mn^{4+}$ was 0.88.

Comparative Example 5

A lithium transition metal composite oxide was prepared according to the same procedure as described in Example 11, except that the molar ratio of $Ni^{2+}/Mn^{4+}$ was 1.

Comparative Example 6

A lithium transition metal composite oxide was prepared according to the same procedure as described in Example 11, except that the molar ratio of $Ni^{2+}/Mn^{4+}$ was 0.29.

Example 16

A transition metal mixture comprising a nickel salt and a manganese salt wherein a molar ratio of Ni/Mn is 1.24 and a cobalt salt is contained in an amount of 8 mol % relative to a total amount of mixture was prepared and dissolved in distilled water. Increasing basicity of the solution containing the foregoing transition metals, a transition metal composite was produced. The obtained composite was filtered through a vacuum filter to remove the solvent, followed by drying in an oven at 110° C. for 18 hours to completely eliminate excess solvent. After adding a Li salt to the resultant product to achieve a molar ratio of $Ni^{2+}/Mn^{4+}$ of 0.76, the mixture was placed in an electric furnace. After elevating the temperature of the furnace to 950° C. at 300° C. per hour, the mixture was subjected to calcination at 980° C. for 10 hours so as to produce a lithium transition metal composite oxide.

Example 17

A lithium transition metal composite oxide was prepared according to the same procedure as described in Example 16, except that the molar ratio of $Ni^{2+}/Mn^{4+}$ was 0.64.

Example 18

A lithium transition metal composite oxide was prepared according to the same procedure as described in Example 16, except that the molar ratio of $Ni^{2+}/Mn^{4+}$ was 0.52.

Example 19

A lithium transition metal composite oxide was prepared according to the same procedure as described in Example 16, except that the molar ratio of $Ni^{2+}/Mn^{4+}$ was 0.41.

Example 20

A lithium transition metal composite oxide was prepared according to the same procedure as described in Example 16, except that the molar ratio of $Ni^{2+}/Mn^{4+}$ was 0.88.

Comparative Example 7

A lithium transition metal composite oxide was prepared according to the same procedure as described in Example 16, except that the molar ratio of $Ni^{2+}/Mn^{4+}$ was 1.

Comparative Example 8

A lithium transition metal composite oxide was prepared according to the same procedure as described in Example 16, except that the molar ratio of $Ni^{2+}/Mn^{4+}$ was 0.29.

Example 21

A transition metal mixture comprising a nickel salt and a manganese salt wherein a molar ratio of Ni/Mn is 1.24 and a cobalt salt is contained in an amount of 8 mol % relative to a total amount of the mixture was prepared and dissolved in distilled water. Increasing basicity of the solution containing the foregoing transition metals, a transition metal composite was produced. The obtained composite was filtered through a vacuum filter to remove the solvent, followed by drying in an oven at 110° C. for 18 hours to completely eliminate excess solvent. After adding a Li salt to the resultant product to achieve a molar ratio of $Ni^{2+}/Mn^{4+}$ of 0.76, the mixture was placed in an electric furnace. After elevating the temperature of the furnace to 950° C. at 300° C. per hour, the mixture was subjected to calcination at 990° C. for 10 hours so as to produce a lithium transition metal composite oxide.

Example 22

A lithium transition metal composite oxide was prepared according to the same procedure as described in Example 21, except that the molar ratio of $Ni^{2+}/Mn^{4+}$ was 0.64.

Example 23

A lithium transition metal composite oxide was prepared according to the same procedure as described in Example 21, except that the molar ratio of $Ni^{2+}/Mn^{4+}$ was 0.52.

Example 24

A lithium transition metal composite oxide was prepared according to the same procedure as described in Example 21, except that the molar ratio of $Ni^{2+}/Mn^{4+}$ was 0.41.

Example 25

A lithium transition metal composite oxide was prepared according to the same procedure as described in Example 21, except that the molar ratio of $Ni^{2+}/Mn^{4+}$ was 0.88.

Comparative Example 9

A lithium transition metal composite oxide was prepared according to the same procedure as described in Example 21, except that the molar ratio of $Ni^{2+}/Mn^{4+}$ was 1.

Comparative Example 10

A lithium transition metal composite oxide was prepared according to the same procedure as described in Example 21, except that the molar ratio of $Ni^{2+}/Mn^{4+}$ was 0.29.

Example 26

A transition metal mixture comprising a nickel salt and a manganese salt wherein a molar ratio of Ni/Mn is 1.24 and a cobalt salt is contained in an amount of 8 mol % relative to a total amount of the mixture was prepared and dissolved in distilled water. Increasing basicity of the solution containing the foregoing transition metals, a transition metal composite was produced. The obtained composite was filtered through a vacuum filter to remove the solvent, followed by drying in an oven at 110° C. for 18 hours to completely eliminate excess solvent. After adding a Li salt to the resultant product to achieve a molar ratio of $Ni^{2+}/Mn^{4+}$ of 0.76, the mixture was placed in an electric furnace. After elevating the temperature of the furnace to 1000° C. at 300° C. per hour, the mixture was subjected to calcination at 950° C. for 10 hours so as to produce a lithium transition metal composite oxide.

Example 27

A lithium transition metal composite oxide was prepared according to the same procedure as described in Example 26, except that the molar ratio of $Ni^{2+}/Mn^{4+}$ was 0.64.

Example 28

A lithium transition metal composite oxide was prepared according to the same procedure as described in Example 26, except that the molar ratio of $Ni^{2+}/Mn^{4+}$ was 0.52.

Example 29

A lithium transition metal composite oxide was prepared according to the same procedure as described in Example 26, except that the molar ratio of $Ni^{2+}/Mn^{4+}$ was 0.41.

Example 30

A lithium transition metal composite oxide was prepared according to the same procedure as described in Example 26, except that the molar ratio of $Ni^{2+}/Mn^{4+}$ was 0.88.

Example 31

A lithium transition metal composite oxide was prepared according to the same procedure as described in Example 1, except that the molar ratio of nickel salt to manganese salt (Ni/Mn) was 1.13.

Example 32

A lithium transition metal composite oxide was prepared according to the same procedure as described in Example 1, except that the molar ratio of Ni/Mn was 1.43.

Comparative Example 11

A lithium transition metal composite oxide was prepared according to the same procedure as described in Example 26, except that the molar ratio of $Ni^{2+}/Mn^{4+}$ was 1.

Comparative Example 12

A lithium transition metal composite oxide was prepared according to the same procedure as described in Example 26, except that the molar ratio of $Ni^{2+}/Mn^{4+}$ was 0.29.

Comparative Example 13

A lithium transition metal composite oxide was prepared according to the same procedure as described in Example 1, except that the molar ratio of Ni/Mn was 1, the cobalt salt was not added, and the calcination temperature was 1000° C.

Comparative Example 14

A lithium transition metal composite oxide was prepared according to the same procedure as described in Comparative Example 13, except that the molar ratio of $Ni^{2+}/Mn^{4+}$ was 1.

Comparative Example 15

A lithium transition metal composite oxide was prepared according to the same procedure as described in Comparative Example 13, except that the molar ratio of Ni/Mn was 0.96.

Comparative Example 16

A lithium transition metal composite oxide was prepared according to the same procedure as described in Comparative Example 13, except that the molar ratio of Ni/Mn was 0.90.

Comparative Example 17

A lithium transition metal composite oxide was prepared according to the same procedure as described in Comparative Example 13, except that the molar ratio of Ni/Mn was 0.82.

Experimental Example 1

As a cathode active material, each of the composite oxides prepared according to Examples 1 to 30 and Comparative Examples 1 to 17 was added and uniformly mixed with NMP such that a ratio by weight (wt. %) of active material:conductive material:binder was 95:2.5:2.5. The mixture was applied to an aluminum foil with a thickness of 20 μm, followed by drying the coated foil at 130° C. to form a cathode. Roll-pressing the formed cathode to have a porosity of about 25%, the treated cathode was subjected to a blanking process to fabricate a cathode in the form of a coin with an area of 1.487 $cm^2$. As an opposite electrode of the fabricated coin type cathode, Li-metal was used. Using an electrolyte comprising 1M $LiPF_6$ in a solvent with a ratio of EC:DMC:DEC=1:2:1, a coin type battery was produced.

Through 0.1 C charge and 0.1 C discharge, a first cycle discharge capacity was obtained to the coin type battery fabricated above. A ratio of 1 C or 2 C discharge capacity relative to 0.1 C discharge capacity was represented by %, followed by measurement of rate capability for the battery. The results are shown in the following Table 1.

TABLE 1

|  | $1^{st}$ cycle discharge capacity (mAh/g) | $1^{st}$ cycle efficiency (%) | 1C discharge/0.1C discharge (%) | 2C discharge/0.1C discharge (%) |
|---|---|---|---|---|
| Example 1 | 161.5 | 89.8 | 90.2 | 86.1 |
| Example 2 | 162.3 | 90.3 | 91.2 | 86.4 |

TABLE 1-continued

| | 1st cycle discharge capacity (mAh/g) | 1st cycle efficiency (%) | 1C discharge/0.1C discharge (%) | 2C discharge/0.1C discharge (%) |
|---|---|---|---|---|
| Example 3 | 158.1 | 90.6 | 91.4 | 86.8 |
| Example 4 | 154.6 | 91.2 | 92.3 | 87.2 |
| Example 5 | 162.1 | 86.9 | 85.1 | 80.3 |
| Comparative example 1 | 150.3 | 83.5 | 76.2 | 65.7 |
| Comparative example 2 | 132.8 | 90.2 | 91.6 | 86.8 |
| Example 6 | 160.2 | 89.0 | 89.6 | 85.5 |
| Example 7 | 161.3 | 89.3 | 90.2 | 86.8 |
| Example 8 | 157.5 | 89.5 | 91.4 | 86.4 |
| Example 9 | 152.6 | 90.6 | 92.1 | 86.9 |
| Example 10 | 159.1 | 85.3 | 86.1 | 78.2 |
| Comparative example 3 | 148.2 | 84.5 | 73.2 | 65.9 |
| Comparative example 4 | 130.5 | 91.2 | 91.8 | 87.2 |
| Example 11 | 160.7 | 89.3 | 90.1 | 84.5 |
| Example 12 | 162.1 | 89.8 | 89.7 | 85.9 |
| Example 13 | 158.3 | 90.5 | 90.5 | 84.3 |
| Example 14 | 154.6 | 90.3 | 91.1 | 86.9 |
| Example 15 | 160.1 | 87.3 | 86.1 | 80.2 |
| Comparative example 5 | 149.9 | 83.8 | 72.2 | 65.2 |
| Comparative example 6 | 128.1 | 89.8 | 90.8 | 86.5 |
| Example 16 | 158.6 | 86.5 | 88.5 | 83.3 |
| Example 17 | 159.3 | 87.2 | 88.2 | 83.0 |
| Example 18 | 157.3 | 86.9 | 89.0 | 83.8 |
| Example 19 | 155.6 | 87.3 | 88.4 | 82.9 |
| Example 20 | 156.1 | 85.5 | 85.1 | 78.2 |
| Comparative example 7 | 143.6 | 81.3 | 69.3 | 62.5 |
| Comparative example 8 | 123.4 | 86.4 | 88.2 | 83.4 |
| Example 21 | 157.2 | 85.5 | 86.9 | 82.1 |
| Example 22 | 157.6 | 85.6 | 86.2 | 82.6 |
| Example 23 | 155.3 | 86.0 | 86.9 | 83.0 |
| Example 24 | 153.6 | 86.2 | 87.8 | 82.4 |
| Example 25 | 155.3 | 84.5 | 84.2 | 75.5 |
| Comparative example 9 | 141.5 | 81.3 | 65.3 | 60.5 |
| Comparative example 10 | 121.6 | 85.7 | 87.3 | 83.5 |
| Example 26 | 154.8 | 83.0 | 84.8 | 79.1 |
| Example 27 | 154.2 | 83.9 | 85.2 | 80.6 |
| Example 28 | 150.3 | 84.2 | 85.3 | 80.7 |
| Example 29 | 148.2 | 84.9 | 86.8 | 81.4 |
| Example 30 | 153.2 | 82.8 | 84.2 | 72.5 |
| Comparative example 11 | 138.2 | 81.3 | 60.3 | 52.2 |
| Comparative example 12 | 118.6 | 84.7 | 85.9 | 81.7 |
| Comparative example 13 | 144.8 | 87.5 | 82.2 | 68.3 |
| Comparative example 14 | 130.2 | 84.3 | 70.1 | 53.6 |
| Comparative example 15 | 140.3 | 87.7 | 81.3 | 68.7 |
| Comparative example 16 | 132.9 | 86.9 | 81.6 | 67.4 |
| Comparative example 17 | 131.2 | 85.2 | 80.5 | 67.5 |

As listed in the above Table 1, all lithium secondary batteries comprising the cathode active materials prepared in Examples of the present invention exhibited the first cycle discharge capacity of above 148 mAh/g as well as the first cycle efficiency of at least 82%. Moreover, all lithium second batteries comprising the cathode active materials prepared in Examples of the present invention had a ratio of 2 C discharge capacity/0.1 C discharge capacity of at least 72%.

Experimental Example 2

As a cathode active material, each of the composite oxides prepared according to Examples 1 to 30 and Comparative Examples 1 to 12 was subjected to structural analysis through Retveld-refinement after XRD measurement. In addition, a ratio of Ni($Ni^{2+}$) introduced into the Li site and a ratio of $Ni^{3+}$ content in nickel(b) to Mn content were calculated and results thereof are shown in the following Table 2.

TABLE 2

| | $M(Ni^{2+})/m(Mn^{4+})$ | | Average oxidation number of transition metal | Average oxidation number of $Ni^{3+}$ among Ni(b), (%) | Average oxidation number Mn and Ni (b) | Ratio of Ni(Ni) of introduced into Li site (%) |
|---|---|---|---|---|---|---|
| | Calculated value | Measured value | | | | |
| Example 1 | 0.76 | 0.73 | 3.11 | 23.1 | 3.12 | 3.07 |
| Example 2 | 0.64 | 0.60 | 3.16 | 35.2 | 3.18 | 2.25 |
| Example 3 | 0.52 | 0.48 | 3.21 | 47.5 | 3.24 | 2.01 |
| Example 4 | 0.41 | 0.40 | 3.25 | 59.1 | 3.30 | 1.55 |
| Example 5 | 0.88 | 0.86 | 3.05 | 11.4 | 3.06 | 4.22 |
| Comparative example 1 | 1 | 1 | 3.00 | 0 | 3.00 | 5.33 |
| Comparative example 2 | 0.29 | 0.25 | 3.29 | 69.4 | 3.35 | 1.2 |
| Example 6 | 0.76 | 0.72 | 3.12 | 23.3 | 3.12 | 3.02 |
| Example 7 | 0.64 | 0.59 | 3.17 | 35.4 | 3.18 | 2.17 |
| Example 8 | 0.52 | 0.48 | 3.2 | 47.6 | 3.24 | 2.06 |
| Example 9 | 0.41 | 0.41 | 3.26 | 59.3 | 3.30 | 1.43 |
| Example 10 | 0.88 | 0.88 | 3.04 | 11.4 | 3.06 | 4.15 |
| Comparative example 3 | 1 | 1 | 3 | 0 | 3 | 5.29 |
| Comparative example 4 | 0.29 | 0.24 | 3.25 | 68.6 | 3.32 | 1.23 |
| Example 11 | 0.76 | 0.74 | 3.15 | 23.5 | 3.15 | 3.1 |
| Example 12 | 0.64 | 0.59 | 3.17 | 35.4 | 3.18 | 2.3 |
| Example 13 | 0.52 | 0.49 | 3.24 | 48.2 | 3.28 | 1.92 |
| Example 14 | 0.41 | 0.42 | 3.28 | 59.7 | 3.32 | 1.57 |
| Example 15 | 0.88 | 0.86 | 3.03 | 11.4 | 3.05 | 4.28 |
| Comparative example 5 | 1 | 1 | 3 | 0 | 3.00 | 5.68 |
| Comparative example 6 | 0.29 | 0.22 | 3.22 | 67.3 | 3.26 | 1.4 |
| Example 16 | 0.76 | 0.75 | 3.16 | 23.6 | 3.16 | 2.98 |
| Example 17 | 0.64 | 0.6 | 3.17 | 35.4 | 3.18 | 2.33 |
| Example 18 | 0.52 | 0.48 | 3.22 | 47.9 | 3.26 | 1.85 |
| Example 19 | 0.41 | 0.41 | 3.27 | 59.5 | 3.31 | 1.46 |
| Example 20 | 0.88 | 0.88 | 3.08 | 11.6 | 3.10 | 4.10 |
| Comparative example 7 | 1 | 1 | 3 | 0.0 | 3.00 | 5.22 |
| Comparative example 8 | 0.29 | 0.27 | 3.38 | 71.1 | 3.42 | 1.12 |
| Example 21 | 0.76 | 0.76 | 3.19 | 23.8 | 3.19 | 3.17 |
| Example 22 | 0.64 | 0.61 | 3.18 | 35.5 | 3.19 | 2.28 |
| Example 23 | 0.52 | 0.50 | 3.26 | 48.5 | 3.30 | 1.88 |
| Example 24 | 0.41 | 0.42 | 3.3 | 60.0 | 3.34 | 1.36 |
| Example 25 | 0.88 | 0.87 | 3.07 | 11.6 | 3.09 | 4.12 |
| Comparative example 9 | 1 | 1 | 3 | 0.0 | 3.00 | 5.12 |
| Comparative example 10 | 0.29 | 0.29 | 3.41 | 71.7 | 3.45 | 1.08 |
| Example 26 | 0.76 | 0.73 | 3.11 | 23.2 | 3.11 | 3.21 |
| Example 27 | 0.64 | 0.59 | 3.17 | 35.4 | 3.18 | 1.77 |
| Example 28 | 0.52 | 0.49 | 3.21 | 47.8 | 3.25 | 1.53 |
| Example 29 | 0.41 | 0.41 | 3.27 | 59.5 | 3.31 | 1.29 |
| Example 30 | 0.88 | 0.87 | 3.07 | 11.6 | 3.09 | 4.32 |
| Example 31 | 0.76 | 0.72 | 3.12 | 24.6 | 3.12 | 2.71 |
| Example 32 | 0.76 | 0.80 | 3.10 | 23.1 | 3.08 | 2.83 |
| Comparative example 11 | 1 | 1 | 3 | 0.0 | 3.00 | 5.80 |
| Comparative example 12 | 0.29 | 0.25 | 3.29 | 69.2 | 3.33 | 1.10 |

From the above Table 2, the ratio (%) of Ni($Ni^{2+}$) introduced into the Li site means a ratio of Ni($Ni^{2+}$) site to a total Li site, that is, a share rate of Ni($Ni^{2+}$).

Further, the major reason that the measured value of m($Ni^{2+}$)/m($Mn^{4+}$) is lower than the calculated value of the same is based on partial evaporation of Li and measurement errors caused by a measuring apparatus.

Referring to Tables 1 and 2, the cathode active material of the present invention exhibits reduced specific surface area depending on temperature and, in turn, slightly decreased capacity. However, it can also be seen that a more stable layered crystalline structure was formed since the average oxidation number of transition metals was higher than +3 independent of variation in temperature and the oxidation number of Ni with the same content as Mn was increased. In addition, it was found that other electrochemical characteristics such as rate features, one cycle charge-discharge efficiency, etc. are constantly increasing according to certain principles, regardless of other conditions such as temperature.

The foregoing results clearly prove that a difference in size between lithium ions and transition metal ions is enlarged by increasing the oxidation number of a transition metal layer so as to contribute to structural stability and to enhance electrochemical characteristics of the active material. According to the present invention, it is understood that adjusting the oxidation number of transition metal to more than +3 may effectively improve stability of the layered crystalline structure of the active material, compared to the case where Ni and Mn are added in equal amounts to the active material, all Ni is $Ni^{2+}$ and the oxidation number of transition metal is +3 (i.e., Comparative Examples 1, 3, 5, 7, 8 and 11).

In particular, even when a ratio of $Ni^{3+}$ content in Ni(b) corresponding to Mn content is more than 50%, the cathode active material of the present invention exhibits superior electrochemical characteristics to those prepared in Comparative Examples.

Meanwhile, as specified in Comparative Examples 13 to 17, when Mn and Ni are present in equal proportions in the overall composition and/or even when Mn content is higher than Ni content, theoretical principles of the present invention in that the oxidation number of Ni with the same content as Mn and the oxidation number of transition metal are increased to enable stabilization of the structure of the active material may also be satisfied, however, reduction in capacity of the active material is observed.

Although the present invention have been described in detail with reference to the foregoing exemplary embodiments, these exemplary embodiments are proposed for illustrative purpose only and those skilled in the art will appreciate that various modifications and variations are possible without departing from the scope and spirit of the invention.

INDUSTRIAL APPLICABILITY

As is apparent from the above disclosure, a cathode active material of the present invention has a relatively high content of $Ni^{3+}$ in nickel corresponding to the content of manganese as well as an average oxidation number of all transition metals other than lithium of more than +3, compared to conventional active substances, so as to have a uniform and stable layered structure and to exhibit excellent overall electrochemical characteristics including battery capacity and, in particular, enhanced high rate charge-discharge features.

The invention claimed is:

1. A cathode active material for a lithium secondary cell, comprising a lithium transition metal oxide with a layered crystalline structure in which the transition metal comprises a transition metal mixture of Ni, Mn and Co, an average oxidation number of all transition metals other than lithium is more than +3, and specific conditions represented by the following Formulae (1), (2) and (3) are satisfied:

$$1.1 < m(Ni)/m(Mn) < 1.5 \quad (1)$$

$$0.4 < m(Ni^{2+})/m(Mn^{4+}) < 1 \quad (2)$$

$$0.11 < m(Ni^{3+})/m(Mn) \leq 0.06 \quad (3)$$

wherein the nickel portion of the mixture comprises nickel (a) in an excess content relative to a content of manganese, as well as nickel (b) with a content corresponding to the content of manganese, and wherein m(Ni)/m(Mn) is a molar ratio of nickel to manganese, m($Ni^{3+}$)/m(Mn) is a molar ratio of $Ni^{3+}$ of nickel (b) to Mn, and m($Ni^{2+}$)/m($Mn^{4+}$) is a molar ratio of $Ni^{2+}$ to $Mn^{4+}$.

2. The active material according to claim 1, wherein the layered crystalline structure is $\alpha$-NaFeO$_2$ laminate crystalline structure.

3. The active material according to claim 1, wherein m(Ni)/m(Mn) is defined by $1.2 \leq m(Ni)/m(Mn) \leq 1.4$.

4. The active material according to claim 1, wherein the average oxidation number of all transition metals other than lithium is more than 3.0 to not more than 3.5.

5. The active material according to claim 4, wherein the average oxidation number of all transition metals other than lithium ranges from 3.01 to 3.3.

6. The active material according to claim 4, wherein the average oxidation number of all transition metals other than lithium ranges from 3.1 to 3.3.

7. The active material according to claim 1, wherein the nickel portion has an average oxidation number of more than +2.

8. The active material according to claim 1, wherein the nickel (a) in the excess content relative to the content of manganese is $Ni^{3+}$.

9. The active material according to claim 1, wherein an overall average oxidation number of the nickel (b) with a content corresponding to the content of manganese is more than 3.0 to not more than 3.5.

10. The active material according to claim 9, wherein the overall average oxidation number of the nickel (b) with the content corresponding to the content of manganese ranges from 3.1 to 3.3.

11. The active material according to claim 1, wherein the nickel (b) with the content corresponding to the content of manganese comprises $Ni^{2+}$ and $Ni^{3+}$.

12. The active material according to claim 1, wherein a molar ratio of $Ni^{2+}$ to $Mn^{4+}$ is defined by $0.4 < m(Ni^{2+})/m(Mn^{4+}) \leq 0.9$.

13. The active material according to claim 1, wherein an average oxidation number of manganese and nickel ranges from 3.05 to 3.35.

14. The active material according to claim 1, wherein a content of Co is less than 10 mol % relative to a total amount of transition metals.

15. The active material according to claim 1, wherein the content of nickel ($Ni^{2+}$) intercalated into lithium sites is lower than 5 mol %.

16. A cathode comprising the cathode active material as set forth in claim 1.

17. A lithium secondary cell having the cathode as set forth in claim 16.

18. The lithium secondary cell according to claim 17, wherein a first cycle discharge capacity is at least 148 mAh/g and a first cycle efficiency is at least 82%.

19. The lithium secondary cell according to claim 17, wherein a ratio of 2 C discharge capacity to 0.1 C discharge capacity is at least 72%.

20. The lithium secondary cell according to claim 17, wherein the secondary cell is used as a power source for any one vehicle selected from an electric car, a hybrid electric car and a plug-in hybrid electric car.

21. The lithium secondary cell according to claim 17, further comprising an anode, a separator and a non-aqueous electrolyte containing lithium salt.

22. The active material according to claim 1, wherein among the transition metals, Ni, Mn, or Co is partially substituted by a small amount of metal elements and/or cationic elements within 5%.

* * * * *